Sept. 15, 1925.           R. O. BINGHAM           1,553,741
                          WAFFLE IRON
                       Filed Nov. 30, 1923
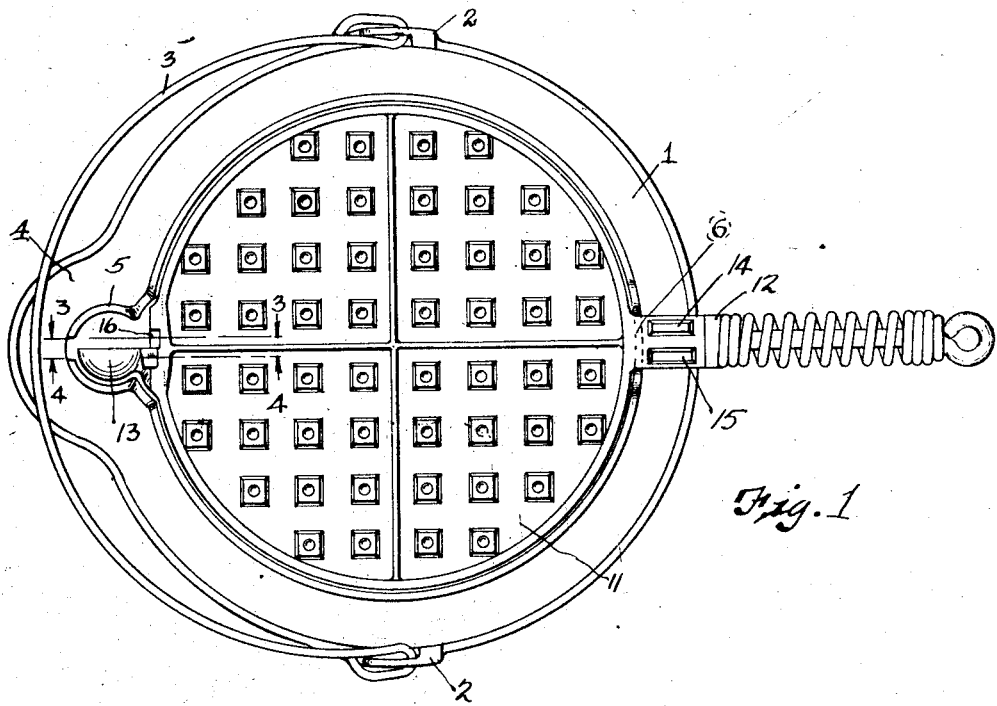
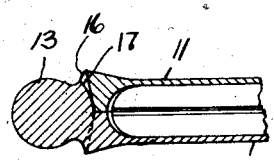
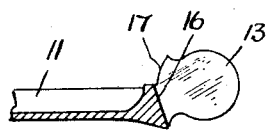
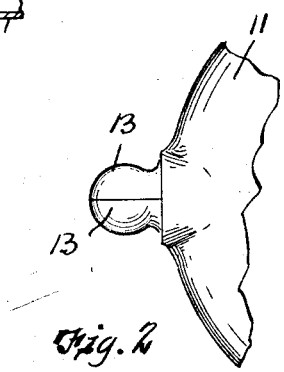
INVENTOR.
Robert O. Bingham
BY
Fay, Oberlin & Fay
ATTORNEYS Patented Sept. 15, 1925.

1,553,741

UNITED STATES PATENT OFFICE.

ROBERT O. BINGHAM, OF SIDNEY, OHIO, ASSIGNOR TO THE WAGNER MANUFACTURING COMPANY, OF SIDNEY, OHIO, A CORPORATION OF OHIO.

WAFFLE IRON.

Application filed November 30, 1923. Serial No. 677,677.

*To all whom it may concern:*

Be it known that I, ROBERT O. BINGHAM, a citizen of the United States, and a resident of Sidney, county of Shelby, and State of Ohio, have invented a new and useful Improvement in Waffle Irons, of which the following is a specification, the principle of the invention being herein explained and the best mode in which I have contemplated applying that principle, so as to distinguish it from other inventions.

This invention relates to waffle irons. More particularly it comprises an improvement over the waffle iron shown in my Patent No. 950,090 of February 22, 1910 which discloses inter-locking means upon the handle shank similar to that shown in the present application.

In said patent, the half balls of the bearing and the adjacent structure of the pans have no interlocking means whatsoever and the alignment of the pans is dependent solely upon the projections and sockets formed on the respective handle shanks for interengagement with each other.

While said interlocking and aligning means on the handles operate satisfactorily so long as the pans are closed, they obviously are thrown out of operation when the upper pan is lifted to inspect the interposed waffles. The present invention provides an interlocking means adjacent the ball journal which serves to maintain the pans in approximate alignment after the upper pan is lifted sufficiently to disengage the interlocking means on the handle shanks. The provision of interlocking means adjacent the ball joint as well as on the handle shanks also serves to maintain the pans in safe alignment (and prevents their sliding apart) when they are lifted wholly free of the waffle ring in the course of their manipulation.

The annexed drawings and the following description set forth in detail certain means and one mode of carrying out the invention, such disclosed means and mode illustrating, however, but one of various ways in which the principle of the invention may be used.

In said drawings:

Figure 1 is a plan view showing the improved waffle iron, the upper pan being removed to better disclose the construction thereof.

Figure 2 is a fragmentary plan view showing the half ball joints of the pans in engagement with each other.

Figure 3 is a vertical sectional view of one of the pans adjacent the ball joint taken along the line 3—3 of Figure 1 looking in the direction of the arrows, and Figure 4 is a vertical sectional view of the ball joint portion of the assembled pans taken along the line 4—4 shown in Figure 1 looking in the direction of the arrows.

As is clearly shown in Figure 1 of the drawing, the construction includes the usual annular support 1 provided with bail ears 2 at its opposite sides within which a wire bail 3 is engaged and having an enlarged flange 4 at its rear with a socket bearing 5 formed adjacent thereto. At the forward edge of the rim of the support, a seat 6 for the handle shanks of the pans is provided.

The waffle iron proper comprises two duplicate pans 11 each having the usual handle and shank 12 at its forward edge and opposite thereto being provided with a half ball bearing 13.

The shank of the handle of each pan is provided on its front side with a lug or projection 14 and symmetrically beside the same is a socket 15 of suitable size to receive the lug 14 of a duplicate handle when two pans are assembled for use, as will be understood by reference to my prior patent above referred to.

At the point where the half ball joins the pan, a wedge shaped recess 16 is provided in the edge of the pan and the adjacent inner circumference of the half ball is provided with a wedge shaped rib or projection 17 of a size suitable to be received within said recess 16 of a companion pan of identical construction when such pans are placed face to face both such recesses and complementary ribs extending inwardly towards the handles on the other sids of the device. As a result, not only are the bearing ends of the pans held against lateral separation in their closed position, but also when the upper pan is lifted by rocking movement about its bearing end. The outer face of the rib 17 may be slightly curved in outline in order to facilitate the engagement thereof with the recess and to permit the lifting of the upper pan without excessive friction at times when it is desired to inspect the contents of the waffle iron. The interlocking devices in no way prevent the free separation of the assembled pans at any time by merely lifting the upper pan in a vertical direction.

Other modes of applying the principle of my invention may be employed instead of the one explained, change being made as regards the means and the steps herein disclosed, provided those stated by any one of the following claims or their equivalents be employed.

I therefore particularly point out and distinctly claim as my invention:

1. A waffle iron comprising two duplicate pan sections, each having a bearing projecting on one side and a handle projecting from the other side, and a complementary rib and recess formed adjacent each of said bearings and extending radially inwardly, the rib of one section being adapted to engage the recess of the other section to hold said pans in alignment.

2. A waffle iron having duplicate pan sections, each provided with a half ball bearing projection on one side, an upstanding rib formed adjacent the plane face of each half ball bearing projection immediately adjacent the inner surface of the pan, and a symmetrically located recess formed in the circumference of said pan adjacent the plane face of said half ball bearing projection and of a size adapted to receive the upstanding rib of a companion pan of said waffle iron.

3. In an apparatus of the character described, the combination of an annular support having a socket bearing at one side and a handle seat opposite thereto, a pair of duplicate pans each provided with a handle and opposite thereto with a half ball bearing projection adapted to be received within said socket, interlocking lugs and sockets formed on each pan adjacent said half ball bearing projection and upon the upper side of the handle shanks, said projections and sockets upon companion pans interlocking to maintain said pans in alignment with each other when assembled for use and to hold same in alignment when lifted from support.

Signed by me, this 24th day of November, 1923.

ROBERT O. BINGHAM.